Patented Dec. 1, 1953

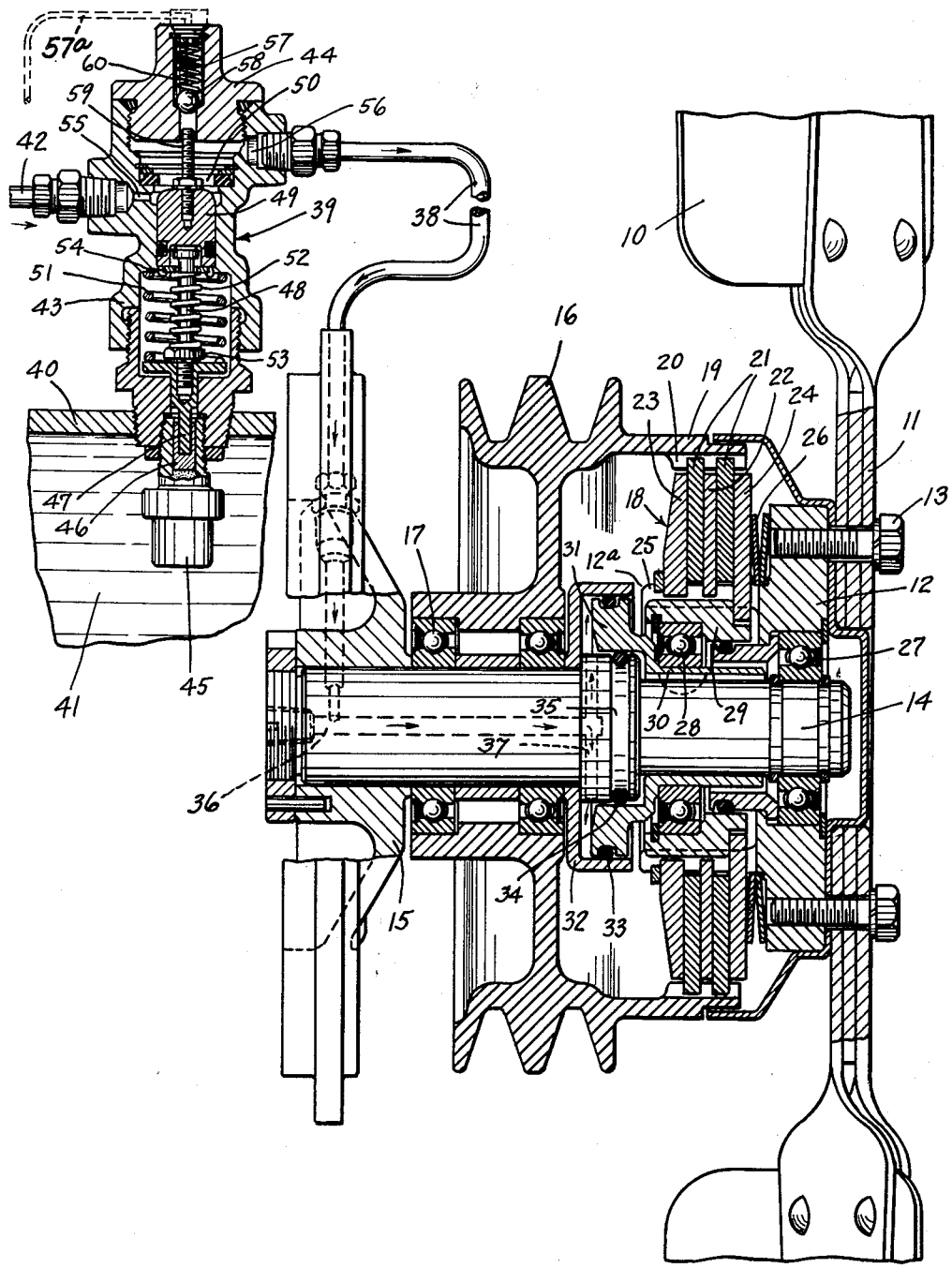
Dec. 1, 1953 — I. A. ENGLANDER — 2,661,148
THERMOSTATICALLY CONTROLLED FAN
Filed April 12, 1951
INVENTOR.
IMRE A. ENGLANDER.
BY
Lockwood, Hahn, Galt & Woodard
ATTORNEYS.

2,661,148

UNITED STATES PATENT OFFICE 2,661,148

THERMOSTATICALLY CONTROLLED FAN

Imre A. Englander, Indianapolis, Ind., assignor to Schwitzer-Cummins Company, Indianapolis, Ind., a corporation Application April 12, 1951, Serial No. 220,647

10 Claims. (Cl. 230—271)

This invention relates to a thermostatically controlled fan driving assembly particularly applicable for cooling systems of trucks and similar vehicles, although applicable to other uses wherein it is desirable to control the drive of the fan according to temperature requirements.

It has long been found desirable to thermostatically control the drive of a cooling system fan as applied to vehicles, such as trucks, buses and the like, for air cooling the system when heated, and discontinue such air cooling when cool. When the engine to which the cooling system is applied falls below efficient operating temperature, it is desirable to conserve power by cutting off the fan drive as well as facilitate temperature increase to an efficient operating range. Various types of thermostatically controlled fans have, therefore, been developed in respect to which this invention is an improvement thereover, such as to bring about the desired results in a more facile, economic and efficient manner.

The invention, therefore, contemplates in general a cooling fan driven through a disk clutch, and wherein the clutch disks are normally spring pressed into clutching engagement for driving the fan and declutching it under fluid pressure controlled by the temperature of the cooling medium in the system, all as hereinafter more specifically set forth and described.

The full nature of the invention will be understood from the accompanying drawings and the following description and claims:

The drawing comprises a cross section of a clutch driven fan and fluid clutch control therefor with portions broken away and in elevation, in association with a thermostatic fluid valve control unit illustrative of one modification of the invention.

In the drawings there is illustrated the usual cooling fan as applied to a motor vehicle having fan blades 10 and fan spider 11. The fan spider is secured to the fan hub 12 by a series of bolts 13. Said fan is mounted for rotation about a shaft 14 secured by a bracket 15 which in turn may be bolted to the forward end of the engine to be cooled in the usual manner. The fan is driven by the engine through a suitable belt, as well understood in the art, which belt drives a double V-pulley 16 rotatably mounted on said shaft through the ball bearings 17. The pulley 16 drives the fan through a clutch assembly indicated at 18 in the manner hereinafter more particularly described.

The pulley 16 is formed with a forwardly extending skirt 19 provided with the splines 20 internally thereof. Rotatably interlocked with said splines and slidable longitudinally thereof, there is a pair of friction disks 21. Intermediate said disks and on opposite sides thereof there is a series of pressure plates 22, 23 and 24, respectively. Each of said pressure plates is provided with inner driving ears projecting into slots indicated at 25 cut peripherally and longitudinally of the inwardly directed hub extension 12a of the hub 12, said extension mounting the clutch 18 to permit axial movement of the several component parts thereof. Interposed between the clutch and the hub 12 there is Belleville spring 26 in the form of opposed dished spring disks so arranged as to exert pressure on one plate of the clutch to render it effective in driving the fan.

The fan hub 12 is rotatably mounted on the shaft 11 by two ball bearings 27 and 28 of which the ball bearing 27 is held in place on the shaft 14 while the ball bearing 28 has its outer race mounted on a release collar 29 extending within the clutch. The inner race of the bearing 28 is mounted upon the sleeve 30 of a piston 31 which is slidably keyed to the shaft 14 for permitting a free axial sliding movement therebetween. Thus, upon the piston 31 being actuated axially of the shaft, it transmits its axial movement through the bearing 28 to the pressure release collar 29. Said collar in turn bears against the inner extension of the friction disk 24 to effect separation of the clutch disks against the tension of the spring 26. The fan will thereupon be released from its driving pulley.

Secured about the stationary shaft 14 there is provided a cylinder 32 interposed between the pulley 16 and the clutch 18. The piston 31 is mounted to reciprocate within the cylinder, being sealed therein by a piston seal ring 33 and an inner sealing ring 34 mounted in a groove 35 provided in an enlargement of the shaft against which the cylinder seats. The piston is normally retracted in the cylinder by the tension exerted through the friction disk 24 and pressure release collar 29 by the spring 26. Under fluid pressure in the cylinder the piston is forced in a direction to free the clutch members through compression of the spring 26.

Fluid pressure is introduced into the cylinder 32 through an axial port 36 in the shaft 14 which terminates in the radial ports 37 open to the interior of the cylinder. The port 36 is in communication with a tubing 38 connected with a thermostatically controlled valve unit indicated at 39. The valve unit is mounted to extend into the radiator 40 of the cooling system, or other reservoir cooling medium indicated at 41. Said valve is connected at its intake side with a line 42 leading from any suitable source of fluid pressure, not shown. The source of pressure may comprise a compressed air tank carried by a vehicle or an oil tank under pressure. As herein shown the operating fluid consists of air, although other operating fluids may be employed with slight modification as hereinafter described.

The valve 39 includes a valve body 43 carrying a valve head 44 and a thermostat 45 which is emersed in the cooling medium 41. The thermostat includes a thermostatic material sensitive to expansion and contraction through changes in temperature and may be of the Vernatherm type of thermostat. Affected by the expansion and contraction of the thermostat there is a piston 46 in which there is seated an actuator post 47 which receives the lower end of a threaded valve stem 48. The valve stem 48 carries a valve piston 49 at the upper end thereof operating in the cylindrical valve seat 50 of rubber or the like, being herein shown in open position. Within the body 43 of the valve there is an outer compression spring 51 bearing downwardly on a flange provided at the upper end of the actuator post 47, the upper end of the spring bearing against a shoulder provided in the valve body. Thus, spring 51 urges the valve piston to open position to the extent permitted by the thermostat 45. Immediately surrounding the valve stem and within the spring 51 there is a second compression spring 52 having its lower end bearing against an adjustable nut 53 on the valve stem and its upper end bearing directly against the valve piston 49, thus urging the valve piston toward valve closing position. The valve piston 49 has free reciprocable play in respect to the valve stem due to the head of the valve stem extending into a recess in the piston and confined therein by the washer 54 secured to the underside of the piston.

The intake side of the valve comprises the intake port 55 entering the valve head below the valve seat 50 and being in communication with the intake line 42. Above the valve seat there is an outlet port 56 in communication with the line 38 leading to the cylinder 32. The valve head is also provided above the valve seat with an exhaust port 57 provided with a ball check valve 58 open to the atmosphere. The valve piston 49 is provided with an adjustable pin 59 extending into the passage leading from the valve chamber above the valve seat to the exhaust port 57 and positioned to unseat the ball 58 against the tension of spring 60 when the valve piston is seated in valve closing position.

In operation, and with high engine temperature, the cooling fan functions in the normal manner, being driven by the pulley 16 through the clutch 18 with its clutch plates and disks in clutching engagement through tension of the spring 26. Thus, the engine coolant 41 may be air cooled. In such operating condition the tension of the spring 26 will have retracted the piston 31 in the cylinder 32 due to the fact that the piston is merely under atmospheric pressure. Such atmospheric pressure results from the fact that the heated cooling medium 41 will have caused the thermostatic element to expand to close the valve piston 49 which opens the line 38 to atmospheric pressure through the exhaust port 57.

Upon the temperature of the cooling medium dropping to a point where air cooling becomes unnecessary or undesirable, contraction of the thermostatic element will permit the spring 51 to retract the valve piston from its seat, causing the ball check valve 58 to close the exhaust port and open the fluid pressure line 42 to the line 38. The resultant fluid pressure will pass into the cylinder 32 and act upon the piston 31 to force it in a direction for effectively separating the clutch disks against the tension of the spring 26 to thereby disconnect the driving pulley from the fan. Thus, the piston 31 moves to the right (in the position of the drawings), carrying with it the pressure release collar 29 which is in direct engagement with and moves the pressure plate 24 away from its adjacent friction disk 21, thereby relieving the remaining plates and disks from frictional driving relation.

Upon the temperature of the cooling medium rising to such temperature as would require air cooling, the thermostat will be caused to expand and seat the valve piston, shutting off the fluid pressure from the line 42, and opening the ball check valve 58 to relieve the pressure in the line 38 through the exhaust port 57. Such pressure release permits the spring 26 to force the pressure plate 24 in a direction to render the clutch 18 effective for driving the fan, at the same time shifting the pressure release collar 29 and piston 30 to its original or normal position. Thus, the fan will be again clutched with the driving pulley for delivering a current of cooling air to the engine.

In connection with the fluid pressure control valve, it may be noted that it is desirable that said valve be instantaneously moved to full open or full closed position so as to permit fluid pressure action or fluid pressure relief of the piston. This is to avoid a drag or slow acting pressure such as to permit slippage of the clutch and consequent wear. For this purpose the adjustable pin 59 mounted on the valve piston 49 is so adjusted that it begins to open the exhaust check valve, causing a drop of air pressure in the line 38 to eliminate any back pressure that would otherwise be exerted against the closing movement of the piston. This permits the spring 52 to expand with a sudden upward stroke such as to force the valve piston firmly against and deeper into the valve seat 50 free of delayed action.

Such sudden upward stroke of the valve piston is arrested when the washer 54 secured to the under side thereof reaches and engages with the enlarged head on the upper end of the stem 48. The clearance between the head of the stem and washer determines the delayed action or lag in the opening movement of the valve, or the length of time that it takes the valve piston to leave its valve seat while the valve stem is gradually moved downwardly drawing the piston with it as the thermostatic element gradually contracts during the drop in temperature of the cooling medium. Therefore, the extent of clearance between the valve stem head and the washer 54 has a direct bearing upon and controls the "low" temperature limit setting. This setting may be made variable and the clearance adjusted by substituting an adjustable nut for the head of the valve stem 48 when desirable.

Furthermore, the above-mentioned clearance enables the valve piston 49 to instantaneously move to full closing or full opening position irrespective of the slow motion of the valve stem due to the slow acting expansion and contraction of the thermostat. Thus, the valve stem may be free to move upwardly or downwardly with the slow action of the thermostat. In connection with the above it will be observed that when the valve is in its full open position, as shown in the drawings, the head of the stem 52 is adjacent the under side of the piston 49 and spaced upwardly from the washer 54. Upon expansion of the thermal element 45 the valve stem is gradually moved upwardly, carrying with it the valve piston until it engages the valve seat 50, closing off the fluid pressure from the line 42. Thereupon, the spring 52, which bears directly against the under side of the piston 49, will snap the piston to its full closed position, deep into the valve seat 50. This is due to the differential pressure between the fluid pressure and said spring, whereupon the fluid pressure is eliminated in favor of the spring pressure when the piston closes the port 55 and simultaneously carries the pin 59 to a position where it engages and opens the check valve 58 in the exhaust port 57 to instantaneously relieve the pressure on the piston 31. The clutch discs are thus freed and prevented from slipping. With the parts in such relative position the valve remains in its full closed position with the head of the stem engaging the washer 54.

Upon a drop in temperature, the stem will be moved downwardly and with it the piston 49. Continued gradual movement of the stem and piston, however, will not open the valve until the piston has been moved from its deep seated closed position free of engagement with the valve seat opening the port 55 and closing the check valve 58. Thereupon the inrush of fluid pressure from the line 42 will overcome the tension of the spring 52, snapping the piston downwardly from the valve seat to its full open position, bearing upon the head of the stem.

Therefore by opening or closing the source of fluid pressure and simultaneously closing or opening the exhaust port respectively by reason of the differential force between the fluid pressure and spring 52, the free play connection between the piston stem and piston will cause a snap action of the piston during the slow acting movement of the stem and at a predetermined setting thereof. This action instantaneously closes or opens the source of fluid pressure and simultaneously opens or closes the exhaust ports respectively.

Accordingly, a clutch, such as herein described, will be decisively engaged or disengaged to avoid a long slipping period, such as to generate excessive heat and reduce its life. If oil or similar fluid is used as a pressure medium in the pressure line to the valve, the exhaust port 57 may be connected by a suitable conduit 57a to a fluid reservoir so that such fluid would be exhausted thereto instead of into the atmosphere, as in the case with air.

The invention claimed is:

1. A thermostatically controlled fan, in combination with a source of fluid pressure and temperature variable medium, comprising a shaft, a fan and hub member rotatably mounted on said shaft, a driving member for rotating said hub member, a multiple disk clutch interposed between said members having adjacent friction disks slidably keyed to said members respectively, a spring interposed between one of said disks and one of said members to constrain said disks in clutching engagement, a cylinder surrounding said shaft adjacent said clutch having a fluid pressure line connected with said source of fluid pressure, a piston in said cylinder surrounding said shaft operatively connected with said one of said clutch disks, and a valve in said pressure line actuated by said temperature variable medium for admitting fluid pressure to and exhausting it from said cylinder to effect the clutching and declutching of said fan.

2. A thermostatically controlled fan, in combination with a source of fluid pressure and temperature variable medium, comprising a shaft, a fan and hub member rotatably mounted on said shaft, a driving member for rotating said hub member, a multiple disk clutch interposed between said members having adjacent friction disks slidably keyed to said members respectively, a spring interposed between one of said disks and one of said members to constrain said disks in clutching engagement, a cylinder mounted adjacent said clutch having a fluid pressure line connected with said source of fluid pressure, a piston in said cylinder operatively connected with said one of said clutch disks, and a valve in said pressure line actuated by said temperature variable medium for admitting fluid pressure to and exhausting it from said cylinder to effect the clutching and declutching of said fan.

3. A thermostatically controlled fan, in combination with a source of fluid pressure and temperature variable medium, comprising a shaft, a fan and hub member rotatably mounted on said shaft, a driving member for rotating said hub member, a multiple disc clutch interposed between said members, a pressure cylinder mounted on and surrounding said shaft adjacent said clutch and having a fluid pressure line connected with said source of fluid pressure, an annular piston surrounding said shaft in said cylinder and operatively connected with said clutch movable in said cylinder in one direction to effect release of said clutch and in the other direction to effect clutching engagement thereof between said members, and a valve in said pressure line actuated by said temperature variable medium for admitting fluid pressure to and exhausting it from said cylinder to actuate said piston for effecting clutching and declutching of said fan.

4. A thermostatically controlled fan, in combination with a source of fluid pressure and temperature variable medium, comprising a shaft, a fan and fan hub rotatably mounted on said shaft, a driving member rotatably mounted on said shaft for driving said fan hub, a multiple disk clutch surrounding said shaft between said driving member and hub having adjacent friction disks slidably keyed to said driving member and fan hub, respectively, an annular plate spring interposed between said fan hub and one of said friction disks keyed thereto for normally constraining said disks in clutching engagement, a cup-like cylinder surrounding said shaft between said driving member and clutch having a fluid pressure line communicating therewith through an axial port in said shaft and connected with said source of fluid pressure, a piston in said cylinder surrounding said shaft, a pressure release collar surrounding said shaft interposed between said piston and said last-mentioned clutch disk, and a valve in said pressure line actuated by said temperature variable medium for admitting fluid pressure to said cylinder for effecting axial displacement of said last-mentioned clutch disk against the tension of said spring for releasing said clutch at a predetermined low temperature and exhausting the pressure from said cylinder to effect engagement of said clutch members under the influence of said spring for driving said fan upon a predetermined high temperature being reached.

5. A thermostatically controlled fan, in combination with a source of fluid pressure and temperature variable medium, comprising a shaft for rotatably mounting a fan thereon, a driving member for said fan, pressure actuated means interposed between said driving member and fan for making and breaking the driving connection therebetween, a conduit connecting said source of fluid pressure with said pressure actuated means, a valve in said conduit movable to open position for admitting pressure to said means and to closed position for exhausting pressure therefrom, a thermostatic element extending into said temperature variable medium, and a delayed action valve rod interconnecting said thermostatic element and valve for effecting instantaneous closing and opening of said valve upon a relatively slow increase and drop in temperature, respectively, of said medium.

6. A thermostatic fluid controlled valve comprising a valve body having a fluid passage between intake, discharge and exhaust ports, a check valve in said exhaust port biased to closed position, a source of fluid pressure connected with said intake port, a cylinder portion in said valve body, a valve seat between said intake port and cylinder portion on the one hand and said exhaust port and outlet port on the other hand, a valve piston reciprocable in said cylinder portion toward and away from said valve seat, said intake port communicating with the cylinder wall on the piston side of said valve seat, a thermal element mounted on said valve, a valve stem connected with said thermal element and having a free play connection with said valve piston, a spring surrounding said valve stem intermediate said stem and valve housing for urging said stem to valve open position, a second spring between said valve stem and piston, and a pin extending from said piston into position for engaging and opening said check valve, said piston being movable by said valve stem upon expansion of said thermal element to close said intake port for relieving fluid pressure thereon and thereafter being movable under tension of said last-mentioned spring into full sealing engagement with said valve seat to close said fluid passage and open said check valve, said stem withdrawing said piston from check valve engagement to permit closing thereof and free of said intake port to permit fluid pressure to force said piston from its valve closing position against the tension of said last-mentioned spring upon retraction of said thermal element.

7. A thermostatic fluid-control valve, in combination with a source of fluid pressure and an expansible and contractible thermal element, comprising a body having a stem portion and a head portion, a cylinder portion within said body, a cylindrical valve seat between said cylinder portion and head portion, a valve piston reciprocable within said cylinder portion and into and out of said valve seat, said cylinder portion having an intake port connected with said pressure source adjacent the piston side of said valve seat and an outlet port communicating with said head portion on the opposite side thereof, a valve stem movable in said stem portion interposed between said thermal element and piston biased against the expansion of said element, a spring interposed between said stem and piston urging said piston toward valve closing position against fluid pressure from said source, and a free play connection between said piston and stem by which said stem will gradually move said piston toward valve engagement for closing off the fluid pressure exerted thereon and permitting said spring to move said piston on said stem to fluid sealing position in said valve seat with a snap action, said stem upon gradual retraction engaging and drawing said piston from its fluid sealing position free of said valve seat to thereupon permit fluid pressure to move said piston on said stem to full open position against the tension of said spring.

8. A thermostatic control for a disk clutch having a series of friction plates and a pressure actuated member for disengaging said plates against spring tension, comprising a valve body having a stem portion and a head portion, a cylinder portion within said body, a cylindrical valve seat between said cylinder portion and head portion, a valve piston reciprocable in said cylinder portion into and out of said valve seat, said cylinder portion having an intake port connected with a source of fluid pressure and communicating with said cylinder portion adjacent said valve seat, an outlet port communicating with said head portion on the opposite side of said valve seat and with said clutch actuating pressure member, a thermal element, a valve stem movable in said stem portion interposed between said thermal element and piston, and a free play connection between said stem and piston to permit gradual movement of said stem before final actuation of said piston to its full open or closed position.

9. A thermostatic fluid control valve, in combination with a source of fluid pressure and an expansible and contractible thermal element, comprising a body having a stem portion and a head portion, a cylinder portion within said body, a valve seat between said cylinder portion and head portion, a valve piston reciprocable within said cylinder portion to and from said valve seat, said cylinder portion having an intake port connected with said pressure source adjacent the piston side of said valve seat and an outlet port communicating with said head portion on the opposite side thereof, a valve stem movable in said stem portion interposed between said thermal element and piston, a free play connection between said stem and piston to permit relative movement therebetween, an exhaust port in said head portion, a check valve in said port biased to closed position, and an adjustable pin carried by said piston for engaging said check valve and opening said port upon said piston approaching its closed position.

10. A thermostatic fluid control valve, in combination with a source of fluid pressure and an expansible and contractible thermal element, comprising a body having a stem portion and a head portion, a cylinder portion within said body, a valve seat between said cylinder portion and head portion, a valve piston reciprocable within said cylinder portion to and from said valve seat, said cylinder portion having an intake port connected with said pressure source adjacent the piston side of said valve seat and an outlet port communicating with said head portion on the opposite side thereof, a valve stem movable in said stem portion interposed between said thermal element and piston, a free play connection between said stem and piston to permit relative movement therebetween, an exhaust port in said head portion, a check valve in said port biased to closed position, means for biasing said valve stem to piston open position, means on said stem engaging with and biasing said piston toward valve closing and check valve opening position, and an adjustable pin carried by said piston for engaging said check valve to open said exhaust port upon said piston being moved with a snap action by the biasing means and through its free play connection with said stem upon said stem moving it to close said intake port.

IMRE A. ENGLANDER.

References Cited in the file of this patent

UNITED STATES PATENTS

| Number | Name | Date |
|---|---|---|
| 1,245,648 | Weld | Nov. 6, 1917 |
| 1,921,042 | Roos | Aug. 8, 1933 |
| 2,022,709 | Embery | Dec. 3, 1935 |
| 2,452,264 | Russell | Oct. 26, 1948 |
| 2,454,182 | Kampa | Nov. 16, 1948 |
| 2,532,896 | Dillman | Dec. 5, 1950 |